US012248267B2

(12) United States Patent
Sawai et al.

(10) Patent No.: US 12,248,267 B2
(45) Date of Patent: Mar. 11, 2025

(54) IMAGE FORMING APPARATUS AND RECORDING MEDIUM FOR DIAGNOSTIC IMAGE AND INFORMATION DISPLAY IMAGE

(71) Applicant: FUJIFILM Business Innovation Corp., Tokyo (JP)

(72) Inventors: Kenji Sawai, Kanagawa (JP); Junichiro Mori, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/979,492

(22) Filed: Nov. 2, 2022

(65) Prior Publication Data

US 2023/0384728 A1 Nov. 30, 2023

(30) Foreign Application Priority Data

May 31, 2022 (JP) ................................ 2022-088725

(51) Int. Cl.
*G03G 15/00* (2006.01)

(52) U.S. Cl.
CPC .................................. *G03G 15/55* (2013.01)

(58) Field of Classification Search
USPC ............................................................ 399/9
See application file for complete search history.

(56) References Cited

U.S. PATENT DOCUMENTS

| | | | | |
|---|---|---|---|---|
| 9,268,277 B2 | | 2/2016 | Sone | |
| 2015/0192884 A1* | | 7/2015 | Sone | G03G 15/5058 399/72 |
| 2019/0258187 A1* | | 8/2019 | Kashiwakura | G03G 15/0266 |
| 2019/0310576 A1* | | 10/2019 | Tomii | G03G 15/0131 |

FOREIGN PATENT DOCUMENTS

| | | | | |
|---|---|---|---|---|
| EP | 3438757 A1 * | 2/2019 | | G03G 15/0121 |
| JP | 2004069833 A * | 3/2004 | | |
| JP | 5999113 B2 | 9/2016 | | |

* cited by examiner

*Primary Examiner* — Quana Grainger
(74) *Attorney, Agent, or Firm* — Oliff PLC

(57) ABSTRACT

An image forming apparatus includes: plural image forming units that form images to be transferred to a recording medium; and a processor configured to cause an information display image to be transferred to a recording medium to which a diagnostic image that has been formed by a diagnosis target image forming unit, which is an image forming unit as a target for a diagnosis among the plural image forming units, is transferred, the information display image being an image representing information and having been formed by a different image forming unit.

10 Claims, 6 Drawing Sheets

IMAGE FORMING APPARATUS AND RECORDING MEDIUM FOR DIAGNOSTIC IMAGE AND INFORMATION DISPLAY IMAGE

CROSS-REFERENCE TO RELATED APPLICATIONS

This application is based on and claims priority under 35 USC 119 from Japanese Patent Application No. 2022-088725 filed May 31, 2022.

BACKGROUND

(i) Technical Field

The present disclosure relates to an image forming apparatus and a recording medium.

(ii) Related Art

In Japanese Patent No. 5999113, an image forming apparatus including a causal part determination unit that determines, when a streak image is generated in a second test image formed by a first bias development scheme, that a causal part of the streak image is not an exposure unit, is disclosed.

SUMMARY

In the case where an image to be transferred to a recording medium is formed using an image forming unit, a desired image may not be able to be formed by the image forming unit depending on an image forming condition. Furthermore, in the case where an image is formed using an image forming unit, for example, a failure in which the area of another image to be formed by the image forming unit decreases may occur.

Aspects of non-limiting embodiments of the present disclosure relate to a technique in which a desired image to be formed on a recording medium is able to be formed by a different image forming unit that is different from an image forming unit that forms an image to be formed on the recording medium.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including: plural image forming units that form images to be transferred to a recording medium; and a processor configured to cause an information display image to be transferred to a recording medium to which a diagnostic image that has been formed by a diagnosis target image forming unit, which is an image forming unit as a target for a diagnosis among the plural image forming units, is transferred, the information display image being an image representing information and having been formed by a different image forming unit.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure will be described with reference to attached drawings.

Figure 1:
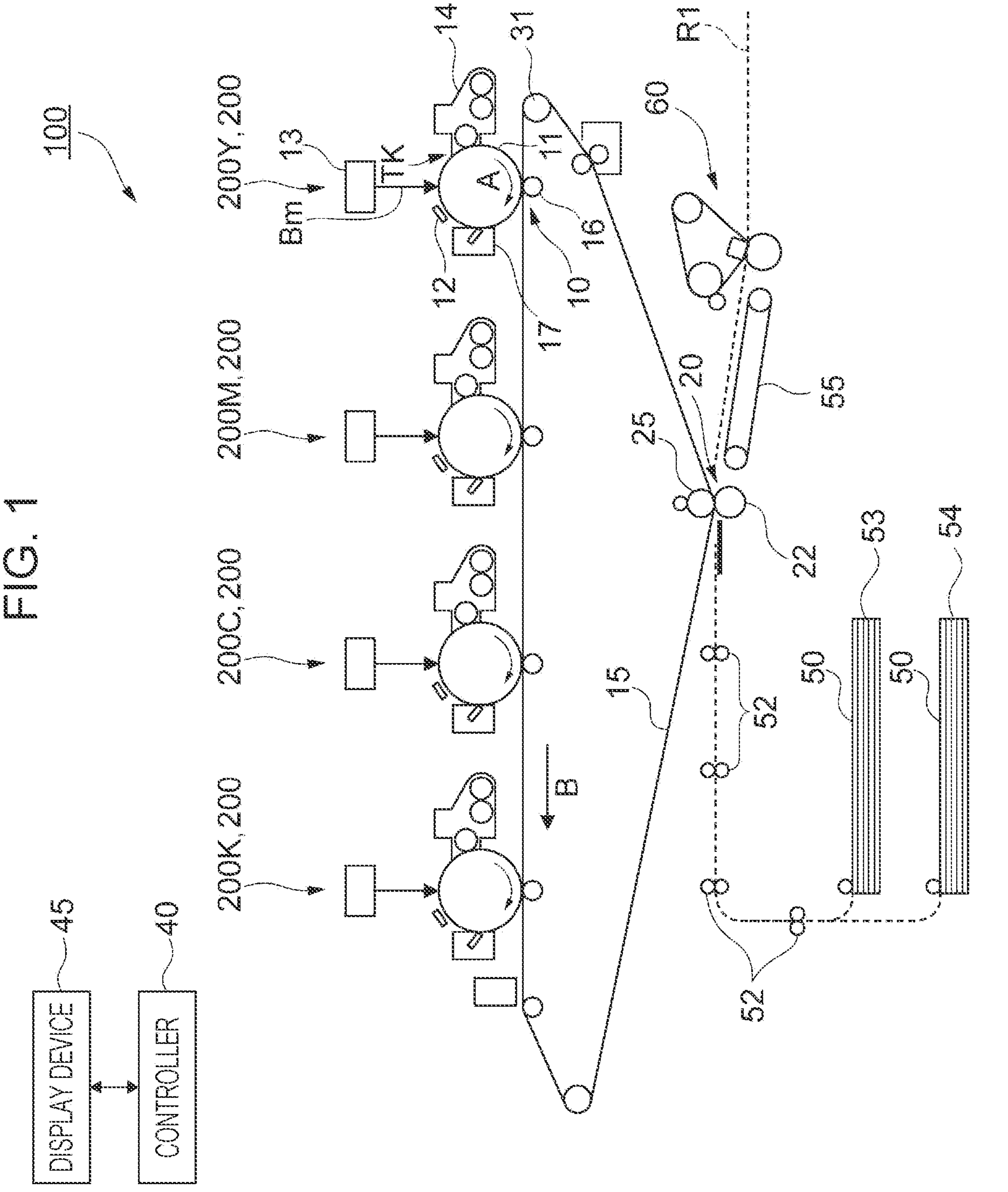
FIG. 1 is a diagram illustrating an image forming apparatus.

FIG. 1 is a diagram illustrating an image forming apparatus 100 according to an exemplary embodiment.

The image forming apparatus 100 is an image forming apparatus of an intermediate transfer system called a tandem type.

The image forming apparatus 100 includes a plurality of image forming units 200 that form images to be transferred to paper 50, which is an example of a recording medium.

Each of the image forming units 200 includes a photoconductor drum 11, which is an example of an image holder, and forms a toner image, which is an image to be transferred to the paper 50, on the photoconductor drum 11, using dry developer. In other words, each of the image forming units 200 forms a toner image to be transferred to the paper 50 on the photoconductor drum 11 using powder developer.

Developer used in this exemplary embodiment contains powder-like dry carrier and powder-like dry toner. Each of the image forming units 200 forms a toner image on the photoconductor drum 11 using powder-like dry carrier and powder-like dry toner. In this example, carrier has a positive charging polarity and toner has a negative charging polarity.

Such dry developer is not necessarily used. Wet developer may be used.

The image forming units 200 use toner of different types to form toner images on the photoconductor drums 11.

In this exemplary embodiment, four image forming units 200: a first image forming unit 200Y, a second image forming unit 200M, a third image forming unit 200C, and a fourth image forming unit 200K.

In this exemplary embodiment, the image forming units 200 are disposed in the order of the first image forming unit 200Y, the second image forming unit 200M, the third image forming unit 200C, and the fourth image forming unit 200K in a moving direction of an intermediate transfer belt 15.

The first image forming unit 200Y forms a toner image using toner of yellow color. The second image forming unit 200M forms a toner image using toner of magenta color. The third image forming unit 200C forms a toner image using toner of cyan color. The fourth image forming unit 200K forms a toner image using toner of black color.

The image forming apparatus 100 also includes the intermediate transfer belt 15, which is an example of an intermediate transfer body, and a first transfer unit 10 for transferring toner images that have been formed by the image forming units 200 to the intermediate transfer belt 15.

The image forming apparatus 100 also includes a second transfer unit 20 for transferring the toner images that have been transferred to the intermediate transfer belt 15 to the paper 50.

The image forming apparatus 100 also includes a fixing device 60 that fixes the toner images that have been transferred to the paper 50 onto the paper 50.

The image forming apparatus 100 also includes a controller 40 that includes a central processing unit (CPU) for executing a program and controls the individual components of the image forming apparatus 100.

The image forming apparatus 100 also includes a display device 45 that includes a display panel or the like. The display device 45 receives an instruction from a user and displays information for the user. The display device 45 includes a touch panel. The display device 45 displays information for the user and receives an instruction from the user.

Figure 2:
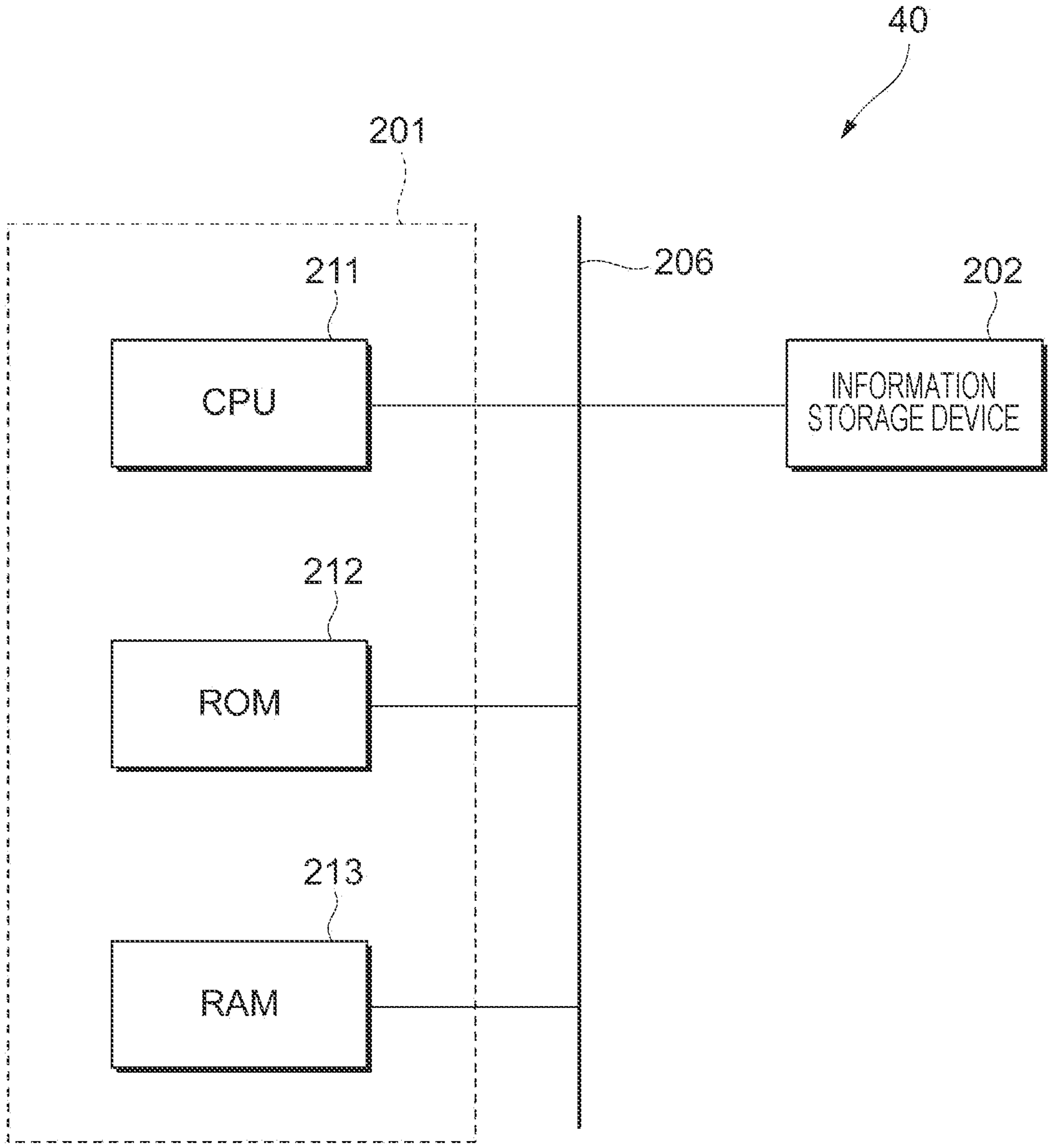
FIG. 2 is a diagram illustrating a configuration of hardware of a controller.

FIG. 2 is a diagram illustrating a configuration of hardware of the controller 40.

The controller 40 includes a processing unit 201 and an information storage device 202 that stores information.

The processing unit 201 includes a computer.

The processing unit 201 includes a CPU 211, which is an example of a processor that performs various processes described later. The processing unit 201 also includes a read only memory (ROM) 212 in which software is stored and a random access memory (RAM) 213 that is used as a work area.

The information storage device 202 is implemented by an existing device such as a hard disk drive, a semiconductor memory, or a magnetic tape.

The processing unit 201 and the information storage device 202 are connected by a bus 206 or a signal line, which is not illustrated in FIG. 2.

A program to be executed by the CPU 211 may be stored in a computer-readable recording medium such as a magnetic recording medium (a magnetic tape, a magnetic disk, or the like), an optical recording medium (an optical disc or the like), a magneto-optical recording medium, or a semiconductor memory and provided to the controller 40. The program to be executed by the CPU 211 may be provided to the controller 40 using communication means such as the Internet.

Referring back to FIG. 1, the image forming apparatus 100 will be described more in detail.

Each of the image forming units 200 includes a developing device 14. The developing device 14 makes an electrostatic latent image on the photoconductor drum 11 a visible image using toner.

Each of the image forming units 200 also includes a charging device 12 that charges the photoconductor drum 11 and an exposure device 13 that forms an electrostatic latent image on the photoconductor drum 11.

In each of the image forming units 200, the photoconductor drum 11, which is an image holder, rotates in an arrow A direction.

For example, the exposure device 13 is a laser exposure device that emits laser. The exposure device 13 may be, for example, an exposure device including a plurality of light sources such as light-emitting diodes (LEDs). In FIG. 1, light emitted from the exposure device 13 is indicated by a sign Bm.

Figure 3:
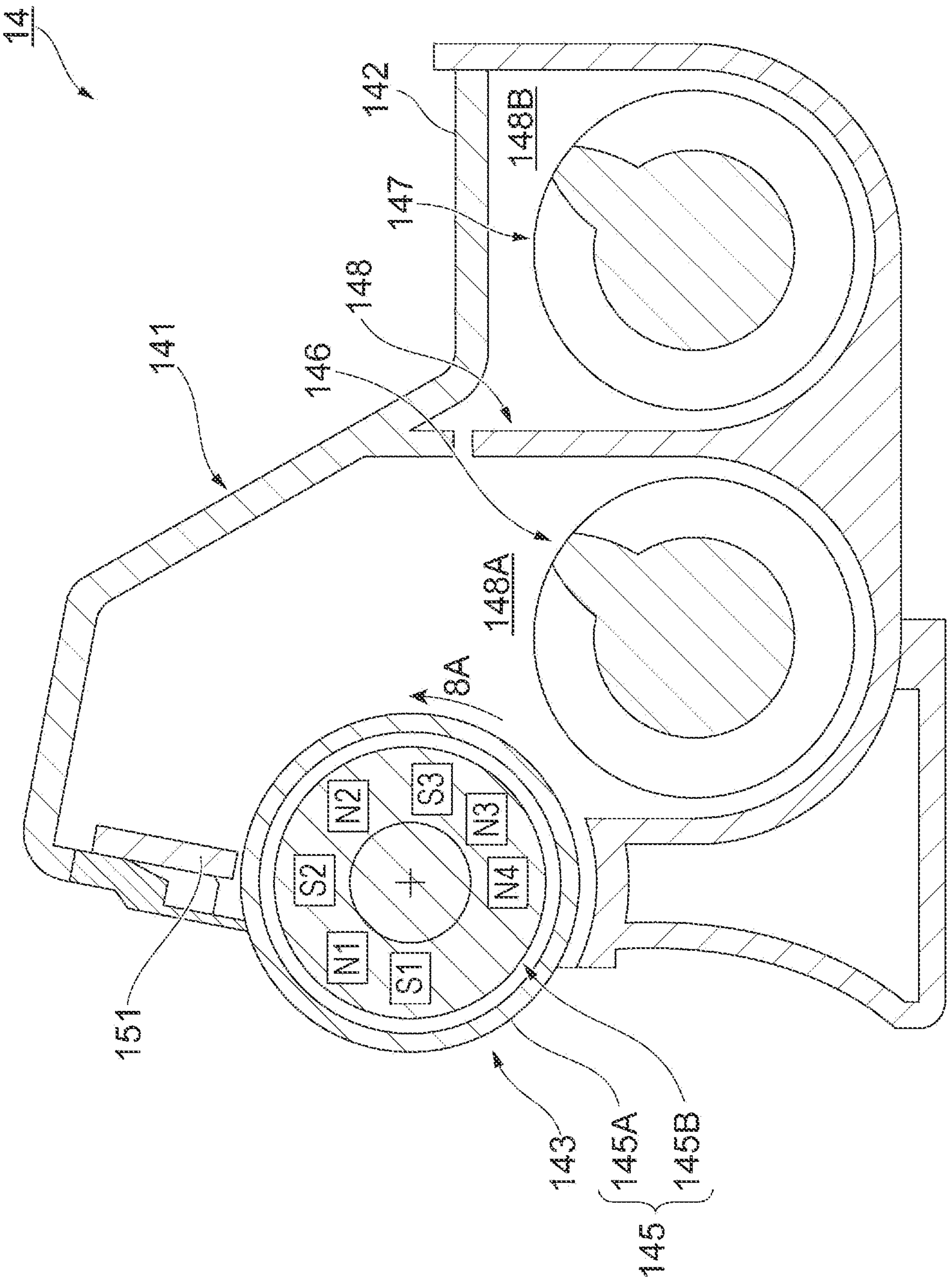
FIG. 3 is a diagram for explaining a developing device.

FIG. 3 is a diagram for explaining the developing device 14.

The developing device 14 includes a housing unit 141 that houses developer. The housing unit 141 includes, for example, a housing case 142 made of resin. The developing device 14 is arranged to extend along a direction from the front to rear side of the image forming apparatus 100 (direction orthogonal to the plane of FIG. 1).

An opening 143 is arranged at a position of the housing case 142 that faces the photoconductor drum 11 (see FIG. 1).

A developing roll 145 for causing developer to be adhered to the surface of the photoconductor drum 11 is provided in the opening 143. The developing roll 145 has a column shape and is arranged to extend along in a direction from the front to rear side of the image forming apparatus 100 (direction orthogonal to the plane of FIG. 3).

The developing roll 145 has a cylindrical body and includes a developing sleeve 145A that rotates in an arrow 8A direction in FIG. 3. The developing roll 145 also includes a magnetic roll 145B arranged inside the developing sleeve 145A. For example, the developing sleeve 145A is made of metal such as steel use stainless (SUS).

Furthermore, the developing device 14 also includes a first transport member 146 and a second transport member 147 that transport developer.

The first transport member 146 is arranged to extend along the direction from the front to rear side of the image forming apparatus 100 and transports developer to, for example, the rear side of the image forming apparatus 100.

The second transport member 147 is also arranged to extend along the direction from the front to rear side of the image forming apparatus 100 and transports developer to the front side of the image forming apparatus 100.

Furthermore, in this exemplary embodiment, the space inside the housing case 142 is partitioned by a partition wall 148. A first space 148A that is located near the photoconductor drum 11 and a second space 148B that is far away from the photoconductor drum 11 are arranged inside the housing case 142.

In this exemplary embodiment, the first transport member 146 is placed in the first space 148A, and the second transport member 147 is placed in the second space 148B.

The partition wall 148 is not formed over the whole area in the longitudinal direction of the housing case 142. The partition wall 148 is not provided on the rear side and the front side of the housing case 142.

Both end parts in the longitudinal direction of the housing case 142 are parts where no partition wall 148 is formed.

Thus, in this exemplary embodiment, developer moves in a circulating manner inside the developing device 14.

Specifically, in this exemplary embodiment, developer inside the first space 148A is transported in the rear-side direction on the plane of FIG. 3 by the first transport member 146. Then, the developer reaches a rear-side end part of the housing case 142, passes through the part where no partition wall 148 is formed, and moves to the second space 148B.

The developer that has moved to the second space 148B is transported in the front-side direction on the plane of FIG. 3 by the second transport member 147. Then, the developer passes through a front-side end part of the housing case 142 where no partition wall 148 is formed, and moves to the first space 148A.

Such a movement of the developer is repeatedly performed, and the developer moves in a circulating manner inside the developing device 14. Furthermore, in this exemplary embodiment, the developer is stirred by the circulating movement.

The developing device 14 further includes a layer restriction unit 151 above the developing roll 145. The layer restriction unit 151 restricts part of the movement of developer adhered to the surface of the developing roll 145 so that the developer adhered to the surface of the developing roll 145 has a predetermined thickness.

The magnetic roll 145B includes seven magnetic poles: N1 to N4 (N poles) and S1 to S3 (S poles) that are aligned along the circumferential direction of the magnetic roll 145B.

The magnetic pole N3 (pick-up pole) attracts developer transported by the first transport member 146. Thus, in this exemplary embodiment, the developer is adhered to the surface of the developing sleeve 145A.

The magnetic pole S2 (trimming pole) makes, in cooperation with the layer restriction unit 151, the developer adhered to the surface of the developing roll 145 have a predetermined thickness.

The magnetic poles S3, N2, and N1 function as transport poles and cause the developer on the developing sleeve 145A to be moved to the downstream side in the rotation direction of the developing sleeve 145A.

The magnetic pole S1 (developing pole), together with the magnetic pole N1 that is adjacent to the magnetic pole S1, makes the developer in a brush-like form. In this exemplary embodiment, toner contained in the developer in the brush-like form moves to the surface of the photoconductor drum 11 (see FIG. 1), and the toner is adhered to the photoconductor drum 11, which is an example of an image holder.

Thus, development is implemented, and a toner image is formed on the photoconductor drum 11.

The toner image is temporarily held on the photoconductor drum 11 and is moved to the first transfer unit 10 (see FIG. 1) by the rotating photoconductor drum 11.

The magnetic pole N4 (pick-off pole), together with the magnetic pole N3 that is adjacent to the magnetic pole N4, forms a repulsive magnetic field and peels off the developer adhered to the surface of the developing sleeve 145A from the developing sleeve 145A.

Referring back to FIG. 1, the image forming apparatus 100 will be described further in more detail.

Each of the image forming units 200 includes a first transfer roll 16 that transfers, at the first transfer unit 10, a toner image that has been formed on the photoconductor drum 11 to the intermediate transfer belt 15.

Each of the image forming units 200 also includes a drum cleaner 17 that removes developer remaining on the photoconductor drum 11.

The intermediate transfer belt 15 is moved in a circular manner at a predetermined speed in an arrow B direction indicated in FIG. 1 by a drive roll 31 that is driven by a motor, which is not illustrated in FIG. 1.

The first transfer unit 10 includes the first transfer roll 16 that is arranged opposite the photoconductor drum 11 with the intermediate transfer belt 15 interposed therebetween. Toner images on the photoconductor drums 11 are electrostatically attracted to the intermediate transfer belt 15 in a sequential manner, and the toner images that are superimposed on one another are formed on the intermediate transfer belt 15.

The second transfer unit 20 includes a second transfer roll 22 that is arranged on the outer surface side of the intermediate transfer belt 15 and a backup roll 25 that is arranged on the inner surface side of the intermediate transfer belt 15.

In this exemplary embodiment, at the second transfer unit 20, toner images that have been formed by the image forming units 200 and transferred to the intermediate transfer belt 15 are transferred to the paper 50 that has been transported to the second transfer unit 20.

A process performed by the image forming apparatus 100 will be described below.

The image forming apparatus 100 receives image data output from, for example, an image reading device or a personal computer (PC), which is not illustrated in drawings. Then, the image forming apparatus 100 performs image processing on the image data. Thus, image data corresponding to the plurality of image forming units 200 are generated.

Specifically, for example, image data for four colors: yellow, magenta, cyan, and black, are generated. The generated image data are output to the corresponding exposure devices 13 provided in the corresponding image forming units 200.

Each of the exposure devices 13 causes light emitted from, for example, a semiconductor laser, to be applied to the corresponding photoconductor drum 11 in accordance with the input image data.

In this exemplary embodiment, after the surface of each of the photoconductor drums 11 is charged by the charging device 12, scan exposure to the surface is performed by the exposure device 13. Thus, an electrostatic latent image is formed on the surface of the photoconductor drum 11.

Next, developing processing by the developing device 14 is performed, and a toner image is then formed on the photoconductor drum 11. At the first transfer unit 10, the toner image is transferred to the intermediate transfer belt 15.

After the toner image is transferred to the intermediate transfer belt 15, the toner image is moved to the second transfer unit 20 by the movement of the intermediate transfer belt 15. At this time, the paper 50 from a first paper housing unit 53 (see FIG. 1) or a second paper housing unit 54 is transported to the second transfer unit 20 by a transport roll 52 and the like.

Then, at the second transfer unit 20, the toner images on the intermediate transfer belt 15 are electrostatically transferred to the paper 50 in a collective manner.

After that, the paper 50 to which the toner images haven been transferred is peeled off from the intermediate transfer belt 15 and transported to a transport belt 55 (see FIG. 1). The transport belt 55 transports the paper 50 to the fixing device 60.

The paper 50 that has been transported to the fixing device 60 is heated and pressurized by the fixing device 60. Thus, the toner images on the paper 50 are fixed to the paper 50. Then, the paper 50 is discharged from the image forming apparatus 100.

In this exemplary embodiment, a diagnosis of whether or not there is a failure is performed for each of the plurality of image forming units 200. More specifically, in this exemplary embodiment, an identification as to whether or not there is a failure and an identification of a part in which the failure has occurred are able to be performed for each of the plurality of image forming units 200.

In this exemplary embodiment, to make a diagnosis for an image forming unit 200, for example, a specifier such as an operator first performs an operation for the display device 45 or the like to specify the image forming unit 200 as a target for the diagnosis.

In this exemplary embodiment, an image forming unit 200 specified by the specifier is defined as a diagnosis target image forming unit 200, which is a target for a diagnosis.

A diagnosis target image forming unit 200 as a target for a diagnosis is not necessarily specified by the specifier. The CPU 211 of the image forming apparatus 100 may specify a diagnosis target image forming unit 200 based on a predetermined condition.

Furthermore, the CPU 211 may specify the plurality of image forming units 200 in order so that a diagnosis will be made for each of all the image forming units 200.

A diagnosis target image forming unit 200 that has been specified as a target for a diagnosis forms a predetermined diagnostic image on the photoconductor drum 11 as an image holder. Then, the diagnostic image that has been formed on the photoconductor drum 11 is temporarily transferred to the intermediate transfer belt 15 and then transferred to the paper 50.

Furthermore, in this exemplary embodiment, in addition to the diagnostic image, various types of information such as information about the diagnosis are added to the paper 50 to which the diagnostic image is transferred.

In this exemplary embodiment, as described below, for example, a case where identification information is added as information to the paper 50 to which the diagnostic image is transferred will be described.

However, information added to the paper 50 is not necessarily identification information. Information such as date and time information indicating the date and time when the diagnosis was made, information about the formed diagnostic image, or information about the specifier may be added to the paper 50.

Moreover, both the identification information and the information other than the identification information may be added as information to the paper 50.

The identification information represents information used for discriminating information associated with the identification information from different information.

In this exemplary embodiment, to add identification information to the paper 50, an identification image, which is an image representing identification information, is formed on the paper 50. In other words, in this exemplary embodiment, an information display image, which is an image representing information, is formed on the paper 50. The identification image is an example of an information display image.

In this exemplary embodiment, the identification image is encoded identification information. Specifically, in this exemplary embodiment, the identification image is a so-called two-dimensional barcode. The identification image may be an image of a different form such as a one-dimensional barcode or may be identification information represented in a text format. In other words, the identification image may be identification information represented by text.

To add information other than the identification information to the paper 50, encoded information may be added to the paper 50 or the information may be represented in a text format.

In this exemplary embodiment, as described above, identification information is added to the paper 50 to which a diagnostic image is transferred. More specifically, in this exemplary embodiment, as described above, an identification image, which is an image representing identification information, is formed on the paper 50 to which a diagnostic image is transferred. In other words, in this exemplary embodiment, an information display image, which is an image representing information, is formed on the paper 50 to which a diagnostic image is transferred.

In this exemplary embodiment, as described later, the identification image is formed by an image forming unit 200 different from the image forming unit 200 that forms the diagnostic image.

The identification image formed by the different image forming unit 200 is temporarily transferred to the intermediate transfer belt 15 and then transferred to the paper 50 from the intermediate transfer belt 15.

In this exemplary embodiment, to form a diagnostic image on the paper 50, the CPU 211, which is an example of a processor, causes the different image forming unit 200 to operate, and causes an identification image to be formed on the photoconductor drum 11 provided in the different image forming unit 200.

In other words, in this exemplary embodiment, in the case where a diagnostic image that has been formed by an image forming unit 200 specified by a specifier is transferred to the paper 50 and formed on the paper 50, the CPU 211 operates the different image forming unit 200, so that an identification image is formed on the photoconductor drum 11 provided in the different image forming unit 200.

Then, in this exemplary embodiment, the identification image that has been formed on the photoconductor drum 11 is transferred to the intermediate transfer belt 15 and then transferred from the intermediate transfer belt 15 to the paper 50 on which the diagnostic image is transferred.

Thus, in this exemplary embodiment, the diagnostic image and the identification image are formed on the same paper 50.

Then, in this exemplary embodiment, a diagnosis for the diagnosis target image forming unit 200 is made based on the paper 50 on which the diagnostic image and the identification image are formed.

Specifically, for example, the above-mentioned specifier visually checks the paper 50 on which the diagnostic image and the identification image are formed and makes a diagnosis for the diagnosis target image forming unit 200.

More specifically, the specifier makes a diagnosis of whether or not there is a failure in the diagnosis target image forming unit 200.

Furthermore, when it is determined that there is a failure in the diagnosis target image forming unit 200, the specifier makes a diagnosis for identifying a component element in which the failure has occurred from among a plurality of component elements configuring the diagnosis target image forming unit 200.

More specifically, in this exemplary embodiment, the diagnosis target image forming unit 200 includes component elements such as the photoconductor drum 11, the charging device 12, the exposure device 13, the developing device 14, and the first transfer roll 16. The specifier makes a diagnosis for identifying a component element in which the failure has occurred from among the component elements configuring the diagnosis target image forming unit 200.

Furthermore, for example, the paper 50 on which the diagnostic image and the identification image are formed is read by a scanner device. Thus, read image data is generated. Then, the read image data is transmitted to, for example, a management server (not illustrated in drawings).

The management server or a diagnosing person who accesses the management server makes a diagnosis for the diagnosis target image forming unit 200.

Specifically, as described above, the management server or the diagnosing person makes a diagnosis of whether or not there is a failure in the diagnosis target image forming unit 200.

Furthermore, when it is determined that there is a failure in the diagnosis target image forming unit 200, the management server or the diagnosing person makes a diagnosis for identifying a component element in which the failure has occurred from among component elements configuring the diagnosis target image forming unit 200.

In this exemplary embodiment, as described above, in the case where the diagnosis target image forming unit 200 forms a diagnostic image, the CPU 211 causes a different image forming unit 200 to operate, and causes an identification image formed by the different image forming unit 200 to be transferred to the paper 50 on which the diagnostic image is formed.

Thus, the paper 50 on which the diagnostic image that has been formed by the diagnosis target image forming unit 200 and the identification image that has been formed by the different image forming unit 200 are formed, is generated.

In other words, in this exemplary embodiment, the paper 50 on which the image that has been formed by the image forming unit 200 specified by the specifier and the identification image that has been formed by the image forming unit 200 that is different from the image forming unit 200 specified by the specifier are formed, is generated.

In other words, in this exemplary embodiment, the paper 50 on which the image that has been formed by the image forming unit 200 specified by the specifier is added and the image that has been formed by the image forming unit 200 that is different from the image forming unit 200 specified by the specifier and contains information such as identification information is added, is generated.

In the case where an identification image is formed on the paper 50, the paper 50 on which a diagnostic image is formed is able to be identified. More specifically, for example, by forming different identification images on individual sheets of paper 50, the paper 50 on which a diagnostic image is formed is able to be identified.

For example, by forming different identification images for individual image forming units 200, an image forming unit 200 that has formed a diagnostic image is able to be identified.

For example, by forming different identification images for individual image forming apparatuses 100, an image forming apparatus 100 that has formed a diagnostic image is able to be identified.

For example, by forming different identification images for individual diagnostic images formed on the paper 50, a diagnostic image that has been formed on the paper 50 is able to be identified.

As described above, an identification image may be an identification image for identifying the paper 50, an identification image for identifying the image forming unit 200, an identification image for identifying the image forming apparatus 100, an identification image for identifying a diagnostic image, or the like.

One of the types of identification image mentioned above may be formed on the paper 50 or two or more types of identification image may be formed on the paper 50.

Furthermore, in addition to such an identification image or in place of such an identification image, an image containing information other than identification information may be added to the paper 50.

In this exemplary embodiment, also in the case where information other than identification information is added to the paper 50, an image forming unit 200 that is different from the diagnosis target image forming unit 200 forms an image containing such information and corresponding such information.

Figure 4A:
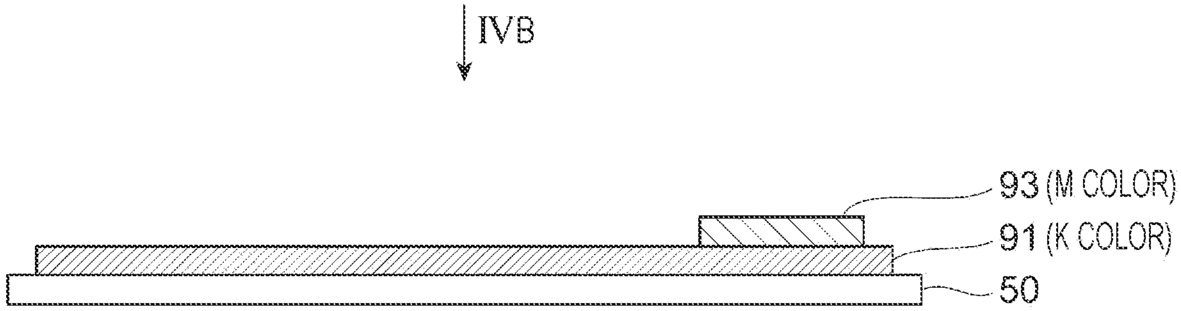
FIGS. 4A and 4B are diagrams illustrating an example of paper on which a diagnostic image and an identification image are formed.
Figure 4B:
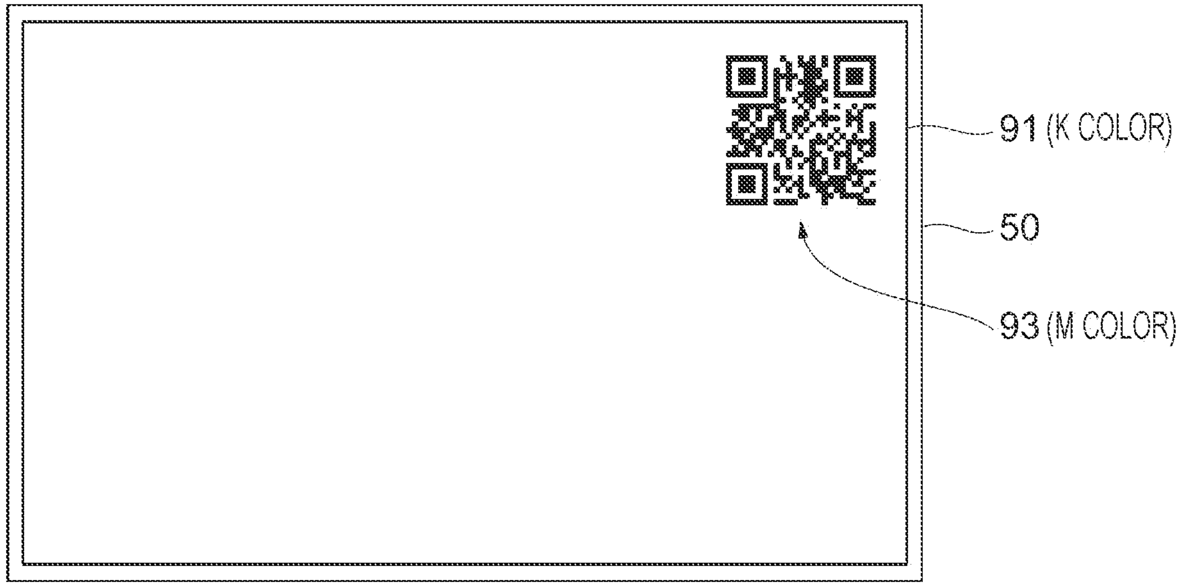

FIGS. 4A and 4B are diagrams illustrating an example of the paper 50 on which a diagnostic image and an identification image are formed. FIG. 4A illustrates the paper 50 viewed from a side, and FIG. 4B illustrates the paper 50 viewed from a direction indicated by an arrow IVB in FIG. 4A. In other words, FIG. 4B illustrates the paper 50 viewed from the front.

In the example illustrated in FIGS. 4A and 4B, a diagnostic image 91 in black color is formed over substantially the entire paper 50. Furthermore, in this example, as illustrated in FIG. 4A, an identification image 93 in magenta color is formed on the diagnostic image 91.

In this exemplary embodiment, in the case where the diagnosis target image forming unit 200 forms the diagnostic image 91, the CPU 211 controls the plurality of image forming units 200 such that the identification image 93 is transferred on the diagnostic image 91, as illustrated in FIGS. 4A and 4B.

In the case where the diagnosis target image forming unit 200 forms the diagnostic image 91, the CPU 211 performs control such that the identification image 93 is formed to be superimposed on the diagnostic image 91 that has been transferred to the paper 50, as illustrated in FIG. 4A.

In this exemplary embodiment, the identification image 93 is arranged opposite the paper 50 with the diagnostic image 91 interposed therebetween, as illustrated in FIG. 4A.

In this exemplary embodiment, as illustrated in FIG. 1, in the direction in which the intermediate transfer belt 15 moves, the second image forming unit 200M that forms the identification image 93 in magenta color is located upstream the fourth image forming unit 200K that forms the diagnostic image 91 in black color.

To form the diagnostic image 91 and the identification image 93, the identification image 93 in magenta color that has been formed by the second image forming unit 200M is first transferred to and placed on the intermediate transfer belt 15.

Then, in this exemplary embodiment, when the identification image 93 in magenta color on the intermediate transfer belt 15 reaches the fourth image forming unit 200K, the diagnostic image 91 in black color that has been formed by the fourth image forming unit 200K is transferred to the intermediate transfer belt 15.

Thus, the identification image 93 in magenta color and the diagnostic image 91 in black color are formed to be superimposed on each other on the intermediate transfer belt 15.

After that, in this exemplary embodiment, the identification image 93 in magenta color and the diagnostic image 91 in black color that are superimposed on each other are transferred to the paper 50 at the second transfer unit 20. Thus, the paper 50 illustrated in FIGS. 4A and 4B is generated.

In the case where the identification image 93 is formed on the paper 50, the CPU 211 causes the identification image 93 that has been formed by an image forming unit 200 that forms an image in a color different from the color of the diagnostic image 91 to be transferred to the paper 50.

Specifically, in this exemplary embodiment, for example, in the case where the color of the diagnostic image 91 is black, the CPU 211 causes the identification image 93 in magenta color, which has been formed by the second image forming unit 200M that forms an image in magenta color, to be transferred to the paper 50.

In other words, for example, in the case where a target for a diagnosis is the fourth image forming unit 200K and the color of the diagnostic image 91 is black, the CPU 211 causes the second image forming unit 200M that forms an image in magenta color to operate to form the identification image 93 in magenta color.

Alternatively, for example, in the case where the color of the diagnostic image 91 is black, the CPU 211 causes an identification image 93 in cyan color, which has been formed by the third image forming unit 200C that forms an image in cyan color, to be transferred to the paper 50.

In other words, for example, in the case where a target for a diagnosis is the fourth image forming unit 200K and the color of the diagnostic image 91 is black, the CPU 211 causes the third image forming unit 200C that forms an image in cyan color to operate to form the identification image 93 in cyan color.

In the case where the color of the identification image 93 is black and the identification image 93 is formed using only one color, it is desirable that the color of the identification image 93 be magenta.

An inventor has found by experiment that the recognition rate of the identification image 93 read by machine is higher in magenta than cyan or yellow.

In the case where the color of the diagnostic image 91 is not black, for example, the CPU 211 causes an identification image 93 in black color, which has been formed by the image forming unit 200 that forms an image in black color, to be transferred to the paper 50.

In other words, for example, in the case where the color of the diagnostic image 91 is not black but a color such as cyan, magenta, or yellow, the CPU 211 causes the fourth image forming unit 200K that forms an image in black color to operate to form the identification image 93 in black color.

Figure 5A:
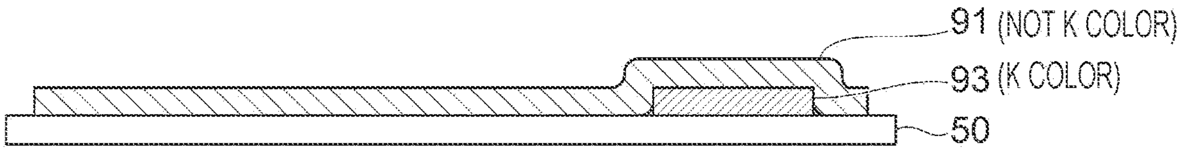
FIGS. 5A and 5B are diagrams illustrating another example of paper on which a diagnostic image and an identification image are formed.
Figure 5B:
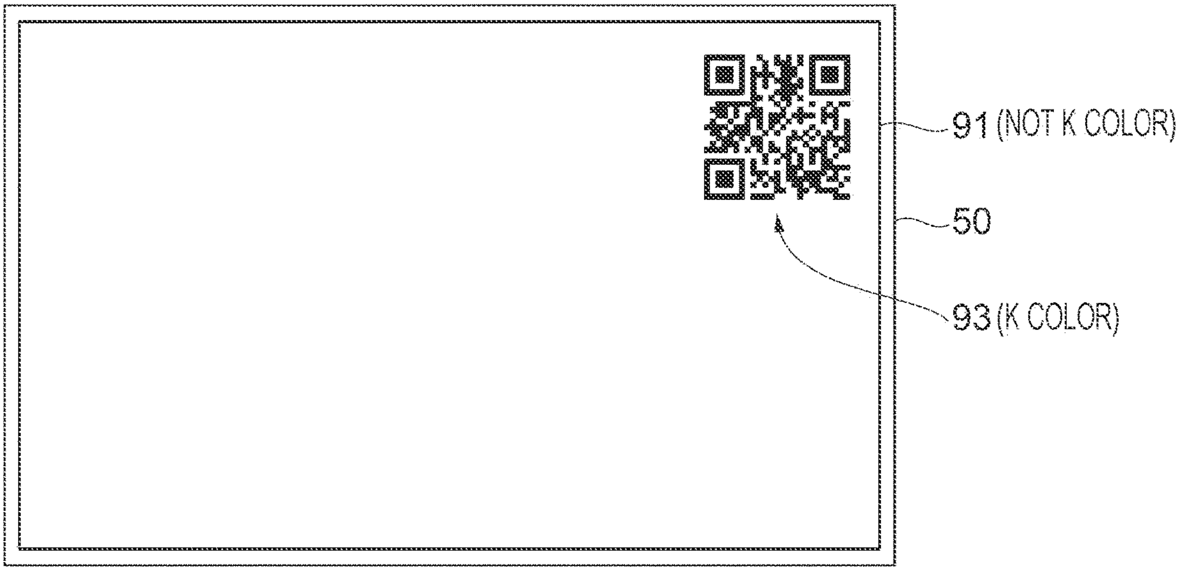

In this case, as illustrated in FIGS. 5A and 5B, which illustrate another example of the paper 50 on which a diagnostic image and an identification image are formed, the identification image 93 in black color is placed on the paper 50 and the diagnostic image 91 in a color not black is placed on the identification image 93 in black color.

Figure 6:
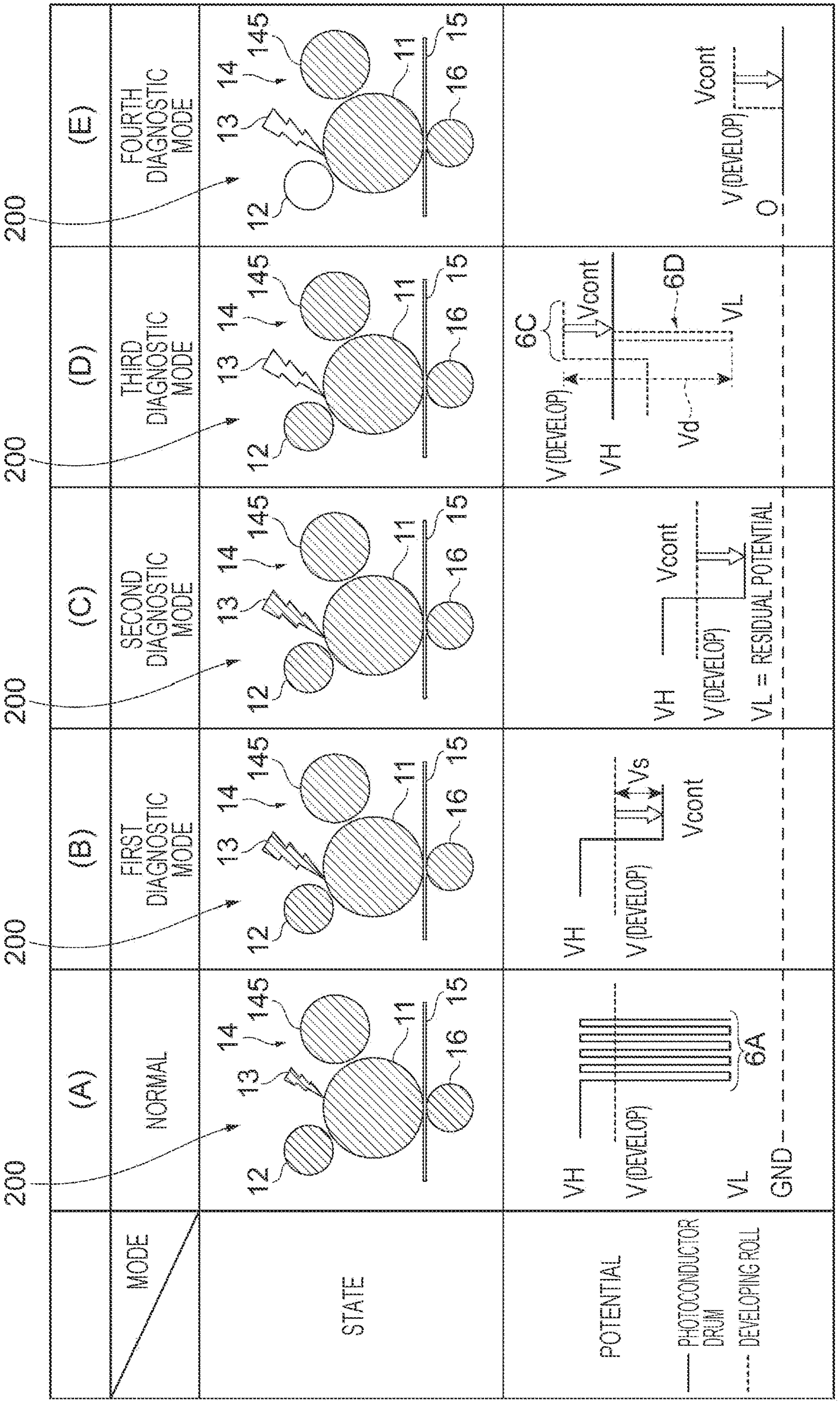
FIG. 6 includes diagrams illustrating states of an image forming unit.

FIG. 6 includes diagrams illustrating states of the image forming unit 200.

In part (A) of FIG. 6, the state of an image forming unit 200 at a normal time is illustrated. In other words, part (A) of FIG. 6 illustrates the state of the image forming unit 200 at the time when the image forming unit 200 performs normal image formation.

In this exemplary embodiment, at the normal time, the photoconductor drum 11 is charged by the charging device 12 so that the potential of the surface of the photoconductor drum 11 becomes VH.

Furthermore, at the normal time, the photoconductor drum 11 is irradiated with light by the exposure device 13 in a selective manner. The potential of a part of the photoconductor drum 11 where an image is to be formed is set to a potential VL, which is lower than the potential of the developing roll 145.

Thus, toner from the developing roll 145 is adhered to the part of the photoconductor drum 11 that has the potential VL, and a toner image is formed on the part that has the potential VL. Then, the toner image is transferred to the paper 50 via the intermediate transfer belt 15, and the toner image is thus formed on the paper 50.

At the normal time, to reduce the density of an image to be formed, as indicated by sign 6A in part (A) of FIG. 6, in addition to the time during which the photoconductor drum 11 is irradiated with light, the time during which the photoconductor drum 11 is not irradiated with light is provided, and a part where no image is formed is thus formed.

A dot-shaped toner image is formed in a part of the photoconductor drum 11 that is irradiated with light, whereas toner is not adhered to a part of the photoconductor drum 11 that is not irradiated with light and a blank region is thus formed in the part that is not irradiated with light.

In this exemplary embodiment, the density of an image to be formed varies according to the size of a dot-shaped toner image and the size of a blank region. When the blank region is relatively large, it appears to the user that the density of the image decreases.

In this exemplary embodiment, at the time of normal image formation, density control is performed on a screen so that the density of an image to be formed decreases.

Parts (B) to (E) of FIG. 6 illustrate states of a diagnosis target image forming unit 200 for which diagnosis processing is performed.

In this exemplary embodiment, there are a plurality of diagnostic modes. The diagnosis target image forming unit 200 operates based on a diagnostic mode specified by the specifier. In this exemplary embodiment, there are four diagnostic modes.

In this exemplary embodiment, in the case where the diagnosis target image forming unit 200 forms the diagnostic image 91 in one of the four diagnostic modes, the identification image 93 that has been formed by a different image forming unit 200 is transferred to the paper 50.

In other words, in this exemplary embodiment, in the case where the diagnostic image 91 is formed under a specific condition that the image forming unit 200 is in one of the four diagnostic modes, the identification image 93 that has been formed by the different image forming unit 200 is transferred to the paper 50.

In the first diagnostic mode illustrated in part (B) of FIG. 6, as described above, the photoconductor drum 11 is charged so that the potential of the surface of the photoconductor drum 11 becomes VH.

Furthermore, in the first diagnostic mode illustrated in part (B) of FIG. 6, the photoconductor drum 11 continues to be irradiated with light by the exposure device 13. In other words, in this processing example, the photoconductor drum 11 continues to be irradiated with light so that the blank region described above is not formed.

Furthermore, in the first diagnostic mode illustrated in part (B) of FIG. 6, the diagnostic image 91 with low image density is formed.

Specifically, in the first diagnostic mode, compared to the normal time illustrated in part (A) of FIG. 6, output of the exposure device 13 is reduced so that a difference Vs between the potential of the surface of the photoconductor drum 11 and the potential of the developing roll 145 decreases.

Thus, in the first diagnostic mode, the diagnostic image 91 with low image density is formed.

In the first diagnostic mode, the diagnostic image 91 with low density is formed by reducing the amount of exposure instead of providing the blank region.

In the first diagnostic mode, exposure is performed uniformly with less output of exposure, and toner from the developing roll 145 is adhered to the whole area on which exposure has been performed uniformly. Thus, the diagnostic image 91 is formed over the whole are on which exposure has been performed uniformly.

In the first diagnostic mode, if light emitted from the exposure device 13 is uneven, gradation caused by the unevenness of light appears more clearly in the diagnostic image 91 formed.

In this case, existence of a failure in the diagnosis target image forming unit 200 is able to be identified. In other words, in this case, existence of a failure in a component element of the diagnosis target image forming unit 200 is able to be identified.

In the case where the density of an image is reduced by forming a dot-shaped image and a blank region as in the normal time described above, even if unevenness occurs in a plurality of dot-shaped images formed, the influence of the unevenness is less likely to appear in the diagnostic image 91.

In contrast, in the first diagnostic mode illustrated in part (B) of FIG. 6, for example, remarkable density unevenness appears in the diagnostic image 91, and it is clear that there is a failure in the image forming unit 200.

In this exemplary embodiment, in the case where a diagnosis is made in the first diagnostic mode, a different image forming unit 200 is caused to operate to form the identification image 93.

Thus, in the first diagnostic mode, not only the diagnostic image 91 that has been formed by the diagnosis target image forming unit 200 but the identification image 93 that has been formed by the different image forming unit 200 is also placed on the paper 50.

In the first diagnostic mode, the exposure device 13 is caused to operate, unlike in the third diagnostic mode or the fourth diagnostic mode, which will be described later. Thus, the diagnosis target image forming unit 200 is able to form the identification image 93.

However, in the case where the diagnosis target image forming unit 200 forms the identification image 93 as well as the diagnostic image 91, the potential or the like of each of the component elements of the diagnosis target image forming unit 200 needs to be changed in the process of image formation. In this case, a secondary failure, which is a failure caused by complication of the process or a change in the middle of the process, may occur.

Furthermore, in the first diagnostic mode, in the case where the identification image 93 is formed from the middle, the area of the diagnostic image 91 may decrease. In this case, it is difficult to detect periodic unevenness in which the density of an image changes periodically.

In the case where the area of the diagnostic image 91 is small, the possibility that the diagnostic image 91 has a periodic unevenness for one period is lower than the case where the area of the diagnostic image 91 is not small.

It is desirable that periodic unevenness for at least one period be included in the diagnostic image 91 for which detection of periodic unevenness is performed. As described above, in the case where the area of the diagnostic image 91 is small, it is difficult to detect periodic unevenness.

Thus, in this exemplary embodiment, in the case where processing is performed in the first diagnostic mode, a different image forming unit 200 is caused to operate to form the identification image 93.

In this case, the identification image 93 is able to be formed without changing a processing condition for the diagnosis target image forming unit 200 in the middle of the process. Furthermore, in this case, a reduction in the area of the diagnostic image 91 formed is suppressed, and detection of periodic unevenness or the like is performed easily.

Part (C) of FIG. 6 is a diagram illustrating the state of the diagnosis target image forming unit 200 in the case where a process is performed in the second diagnostic mode.

In the second diagnostic mode, the charging potential VH of the photoconductor drum 11 and the potential of the developing roll 145 are set to be smaller than those in the first diagnostic mode described above. Furthermore, in the second diagnostic mode, the photoconductor drum 11 continues to be irradiated with light by the exposure device 13 and output of the exposure device 13 is set to be higher than that in the first diagnostic mode described above.

In the second diagnostic mode, the charging potential VH of the photoconductor drum 11 is low and the output of the exposure device 13 is high. Thus, when exposure is performed, the potential of the photoconductor drum 11 decreases to the residual potential of the photoconductor drum 11.

Furthermore, in the second diagnostic mode, as described above, the surface of the photoconductor drum 11 is exposed with light in a uniform manner. Developer is adhered to the part exposed with light in the uniform manner, and a toner image not including the blank region described above is formed as the diagnostic image 91, as described above.

In the second diagnostic mode, even if there is a small failure in the charging device 12 or the exposure device 13, the failure does not affect the potential of the photoconductor drum 11. In this case, even if there is a failure in the charging device 12 or the exposure device 13, the influence of the failure is less likely to appear in the diagnostic image 91.

In this processing example, regardless of whether or not there is a failure in the charging device 12 or the exposure device 13, the potential of the photoconductor drum 11 decreases to the residual potential, and the potential of the photoconductor drum 11 is substantially constant regardless of whether or not there is a failure in the charging device 12 or the exposure device 13.

A case where an image defect such as density unevenness or a streak appears in the diagnostic image 91 formed in the first diagnostic mode in which the potential of the photoconductor drum 11 does not decrease to the residual potential will be assumed.

In contrast, a case where such an image defect does not appear in the diagnostic image 91 formed in the second diagnostic mode in which the potential of the photoconductor drum 11 decreases to the residual potential will be assumed.

In this case, it is able to detect that there is no failure in the first transfer unit 10 or the developing device 14.

In this exemplary embodiment, also in the case where the process is performed in the second diagnostic mode, a different image forming unit 200 is caused to operate to form the identification image 93.

Also in the second diagnostic mode, the exposure device 13 is caused to operate. Thus, the diagnosis target image forming unit 200 is able to form the identification image 93. However, because of the reason mentioned above, the different image forming unit 200 is caused to form the identification image 93 in the process in the second diagnostic mode.

Thus, also in the second diagnostic mode, the identification image 93 that has been formed by the different image forming unit 200 as well as the diagnostic image 91 that has been formed by the diagnosis target image forming unit 200 is placed on the paper 50.

Part (D) of FIG. 6 illustrates the state of the diagnosis target image forming unit 200 in the third diagnostic mode.

In the third diagnostic mode, as indicated by sign 6C, the potential of the developing roll 145 is set to be higher than the charging potential VH of the photoconductor drum 11. Furthermore, in the third diagnostic mode, exposure processing for the photoconductor drum 11 is not performed.

Also in this case, toner adhered to the developing roll 145 moves to the photoconductor drum 11, and a toner image is uniformly formed on the surface of the photoconductor drum 11.

In the third diagnostic mode, the diagnostic image 91 is formed on the photoconductor drum 11 over the whole area in the axis direction of the photoconductor drum 11, and the band-shaped diagnostic image 91 extending in both the axis direction of the photoconductor drum 11 and the circumferential direction of the photoconductor drum 11 is formed on the photoconductor drum 11.

In the third diagnostic mode, exposure processing is not performed. Thus, no control is performed regarding the position to which toner is to be adhered, and toner is adhered to the photoconductor drum 11 over the whole range in the axis direction of the photoconductor drum 11 whose whole area in the axis direction has been charged.

The "whole area in the axis direction of the photoconductor drum 11" represents the entire area of a region of the photoconductor drum 11 in which a toner image is supposed to be formed and does not represent the entire area between one end part and the other end part in the axis direction of the photoconductor drum 11.

In the third diagnostic mode, detection of whether or not there is a failure in the exposure device 13 is able to be performed.

In the case where, for example, a streak-shaped image defect has occurred in the diagnostic image 91 in the first diagnostic mode in which exposure processing is performed and such a streak-shaped image defect has not occurred in the diagnostic image 91 in the third diagnostic mode in which exposure processing is not performed, it is detected that there is a failure in the exposure device 13.

In this exemplary embodiment, also in the third diagnostic mode, the CPU 211 causes the different image forming unit 200 to operate, and causes the identification image 93 formed by the different image forming unit 200 to be transferred to the paper 50 on which the diagnostic image 91 is formed.

In this processing example, as described above, a band-shaped toner image extending in the axis direction of the photoconductor drum 11 and the circumferential direction of the photoconductor drum 11 is formed without exposure processing being performed, and formation of the identification image 93 is not able to be performed.

Thus, in this exemplary embodiment, also in the third diagnostic mode, the different image forming unit 200 is caused to operate, and causes the identification image 93 formed by the different image forming unit 200 to be transferred to the paper 50.

In this exemplary embodiment, as described above, in the case where the diagnostic image 91 is formed without exposure processing being performed for the photoconductor drum 11, the CPU 211 causes the different image forming unit 200 to operate to form the identification image 93.

Thus, also in this case, the identification image 93 is able to be formed on the paper 50 on which the diagnostic image 91 that has been formed by the diagnosis target image forming unit 200 is formed.

More specifically, in the third diagnostic mode, the paper 50 illustrated in FIGS. 4A and 4B or the paper 50 illustrated in FIG. 5A or 5B is generated.

Also in the third diagnostic mode, exposure processing is able to be performed. However, as described above, if a processing condition is changed in the middle of the process, the process may become complicated or a secondary failure may occur.

Specifically, a failure in which carrier in the developing device 14 moves to the photoconductor drum 11 may occur as a secondary failure. More specifically, in the third diagnostic mode, as indicated by sign 6D, if exposure processing is performed, the potential difference Vd between the photoconductor drum 11 and the developing roll 145 increases, and, for example, a failure in which carrier in the developing device 14 moves to the photoconductor drum 11 may occur.

In contrast, in the case where the different image forming unit 200 forms the identification image 93, occurrence of such a failure is reduced.

Part (E) of FIG. 6 illustrates the state of the diagnosis target image forming unit 200 in the fourth diagnostic mode.

In the fourth diagnostic mode, the potential of the photoconductor drum 11 is set to zero. Furthermore, the potential of the developing roll 145 is set to be higher than the potential of the photoconductor drum 11.

Thus, also in this case, toner adhered to the developing roll 145 moves to the photoconductor drum 11, and as described above, the band-shaped diagnostic image 91 extending in both the axis direction of the photoconductor drum 11 and the circumferential direction of the photoconductor drum 11 is formed on the surface of the photoconductor drum 11.

Also in this processing example, as described above, exposure is not performed. Thus, the diagnosis target image forming unit 200 is not able to form the identification image 93.

Furthermore, in the fourth diagnostic mode, even if exposure is performed, the potential of a part of the photoconductor drum 11 on which exposure has been performed is still zero, and the identification image 93 is not able to be formed even if exposure is performed.

In this exemplary embodiment, also in the fourth diagnostic mode, the CPU 211 causes the different image forming unit 200 to operate, and causes the identification image 93 formed by the different image forming unit 200 to be transferred to the paper 50 on which the diagnostic image 91 is formed.

Thus, also in the fourth diagnostic mode, the identification image 93 is formed on the paper 50 on which the diagnostic image 91 is formed.

More specifically, in the fourth diagnostic mode, the paper 50 illustrated in FIG. 4A or 4B or the paper 50 illustrated in FIG. 5A or 5B is generated.

In the fourth diagnostic mode, a failure that may occur in the charging device 12 or the exposure device 13 is able to be detected.

In the case where an image defect has occurred in the first diagnostic mode in which charging processing and exposure processing are performed and such an image defect has not occurred in the fourth diagnostic mode in which neither the charging processing nor the exposure processing is performed, it may be detected that there is a failure in the charging device 12 or the exposure device 13.

Each of the second to fourth diagnostic modes described above may be considered as a mode for identifying a component element in which a failure has occurred from among a plurality of component elements configuring the diagnosis target image forming unit 200.

Furthermore, the diagnostic image 91 formed in each of the second to fourth diagnostic modes may be considered as a diagnostic image 91 for identifying a component element in which a failure has occurred from among the plurality of component elements configuring the diagnosis target image forming unit 200.

In this exemplary embodiment, in the case where the diagnosis target image forming unit 200 operates in one of the second to fourth diagnostic modes, the diagnostic image 91 that has been formed by the diagnosis target image forming unit 200 and the identification image 93 that has been formed by the different image forming unit 200 are placed on the same paper 50.

Furthermore, the first diagnostic mode may be considered as a mode for identifying whether or not there is a failure in the diagnosis target image forming unit 200. Furthermore, the diagnostic image 91 formed in the first diagnostic mode may be considered as a diagnostic image 91 for identifying whether or not there is a failure in the diagnosis target image forming unit 200.

In this exemplary embodiment, also in the case where the diagnosis target image forming unit 200 operates in the first diagnostic mode, the diagnostic image 91 that has been formed by the diagnosis target image forming unit 200 and the identification image 93 that has been formed by the different image forming unit 200 are placed on the same paper 50.

(Others)

The configuration in which the intermediate transfer belt 15 is provided is described above. However, the intermediate transfer belt 15 is not necessarily provided, and an image formed by each of the image forming units 200 may be directly transferred to the paper 50 passing through the image forming units 200 in order.

As described above, with the configuration in which images are directly transferred to the paper 50, by disposing an image forming unit 200 of a color, such as magenta, not black, downstream the image forming unit 200 of black, the identification image 93 in magenta color or the like is able to be formed on the diagnostic image 91 in black color, as described above.

Furthermore, with the configuration in which images are directly transferred to the paper 50, by disposing the image forming unit 200 of black downstream an image forming unit 200 of magenta or the like, the identification image 93 in black is able to be formed on the diagnostic image 91 in color not black.

Furthermore, the case where a single diagnosis target image forming unit 200 is caused to operate and a diagnostic image 91 corresponding to the diagnosis target image forming unit 200 is formed has been described above. In other words, for example, the case where there is a single diagnosis target image forming unit 200 has been described.

However, the number of diagnosis target image forming units 200 is not limited to one. Two or more diagnosis target image forming units 200 may be provided.

In this case, for example, images formed by two diagnosis target image forming units 200 are superimposed on each over on the intermediate transfer belt 15, and the superimposed images formed by the two diagnosis target image forming units 200 are defined as a diagnostic image 91.

More specifically, in this case, the two diagnosis target image forming units 200 are caused to operate in one of the first to fourth diagnostic modes, and images that have been formed by the two diagnosis target image forming units 200 and superimposed on each other on the intermediate transfer belt 15 are used as a diagnostic image 91.

More specifically, for example, the first image forming unit 200Y (see FIG. 1) and the second image forming unit 200M are caused to operate, and a yellow toner image and a magenta toner image that have been formed by the corresponding diagnosis target image forming units 200 and superimposed on each other are used as a diagnostic image 91.

Also in this case, as described above, for example, the fourth image forming unit 200K, which is different from the two diagnosis target image forming units 200, is caused to operate to form an identification image 93 in black color.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An image forming apparatus comprising:

a plurality of image forming units that form images to be transferred to a recording medium; and a processor configured to cause an information display image to be transferred to a recording medium to which a diagnostic image that has been formed by a diagnosis target image forming unit, which is an image forming unit as a target for a diagnosis among the plurality of image forming units, is transferred, the information display image being an image representing information and having been formed by a different image forming unit.

(((2)))

The image forming apparatus according to (((1))), wherein the processor is configured to cause the information display image that has been formed by an image forming unit that forms an image in a color different from a color of the diagnostic image to be transferred to the recording medium.

(((3)))

The image forming apparatus according to (((2))), wherein the processor is configured to, in a case where the color of the diagnostic image is black, cause the information display image in magenta color that has been formed by an image forming unit that forms an image in magenta color to be transferred to the recording medium.

(((4)))

The image forming apparatus according to (((2))), wherein the processor is configured to, in a case where the color of the diagnostic image is not black, cause the information display image in black color that has been formed by an image forming unit that forms an image in black color to be transferred to the recording medium.

(((5)))

The image forming apparatus according to any one of (((1))) to (((4))), wherein the processor is configured to cause the information display image to be transferred in such a manner that the diagnostic image that has been transferred to the recording medium and the information display image are superimposed on each other.

(((6)))

The image forming apparatus according to any one of (((1))) to (((5))), wherein the processor is configured to, in a case where the diagnosis target image forming unit forms the diagnostic image under a specific condition, cause the information display image that has been formed by the different image forming unit to be transferred to the recording medium.

(((7)))

The image forming apparatus according to (((6))), wherein the processor is configured to, in a case where the diagnosis target image forming unit forms the diagnostic image under a condition that the diagnosis target image forming unit forms the diagnostic image without performing exposure processing for an image holder, cause the information display image that has been formed by the different image forming unit to be transferred to the recording medium.

(((8)))

The image forming apparatus according to (((6))), wherein the processor is configured to, in a case where the diagnosis target image forming unit forms the diagnostic image under a condition that the diagnosis target image forming unit forms the diagnostic image without performing charging processing and exposure processing for an image holder, cause the information display image that has been formed by the different image forming unit to be transferred to the recording medium.

(((9)))

The image forming apparatus according to (((1))), wherein the processor is configured to, in a case where the diagnostic image for identifying a component element in which a failure has occurred from among a plurality of component elements configuring the diagnosis target image forming unit is formed by the diagnosis target image forming unit, cause the information display image that has been formed by the different image forming unit to be transferred to the recording medium.

(((10)))

The image forming apparatus according to (((1))), wherein the processor is configured to, in a case where the diagnostic image is formed on an image holder provided in the diagnosis target image forming unit over a whole area in an axis direction of the image holder, cause the information display image that has been formed by the different image forming unit to be transferred to the recording medium.

(((11)))

An image forming apparatus comprising:

a plurality of image forming units that form images to be transferred to a recording medium; and a processor configured to cause an information display image to be transferred to a recording medium to which an image that has been formed by a specified image forming unit, which is an image forming unit specified by a specifier from among the plurality of image forming units, is transferred, the information display image being an image representing information and having been formed by a different image forming unit.

(((12)))

A program for causing a computer to execute a process comprising:

causing an information display image to be transferred to a recording medium to which a diagnostic image that has been formed by a diagnosis target image forming unit, which is an image forming unit as a target for a diagnosis among a plurality of image forming units, is transferred, the information display image being an image representing information and having been formed by a different image forming unit.

(((13)))

A program for causing a computer to execute a process comprising:

causing an information display image to be transferred to a recording medium to which an image that has been formed by a specified image forming unit, which is an image forming unit specified by a specifier from among a plurality of image forming units, is transferred, the information display image being an image representing information and having been formed by a different image forming unit.

(((14)))

A recording medium on which:

a diagnostic image that has been formed by an image forming unit as a target for a diagnosis among a plurality of image forming units; and an information display image that is an image representing information and has been formed by a different image forming unit among the plurality of image forming units are formed.

(((15)))

The recording medium according to (((14))), wherein the diagnostic image and the information display image are superimposed on each other.

(((16)))

The recording medium according to (((15))), wherein the diagnostic image is in black color, and wherein the information display image is in magenta color.

(((17)))

The recording medium according to (((15))), wherein the diagnostic image is not in black color, and wherein the information display image in black color.

(((18)))

A recording medium on which:

an image that has been formed by an image forming unit that has been specified by a specifier from among a plurality of image forming units; and an information display image that is an image representing information and has been formed by a different image forming unit among the plurality of image forming units are formed.

What is claimed is:

1. An image forming apparatus comprising:

a plurality of image forming units configured to form images to be transferred to a recording medium; and a processor configured to cause a diagnostic image formed by only a diagnosis target image forming unit to be transferred to a recording medium, wherein the diagnosis target image forming unit is only one of the plurality of image forming units that is a target for diagnosis, and an information display image formed by another one of the plurality of image forming units to be transferred to the recording medium, wherein the information display image is an image representing information with at least one of a barcode and text.

2. The image forming apparatus according to claim 1, wherein the processor is configured to cause the other one of the plurality of image forming units to be one that forms images in a color different from a color of the diagnostic image.

3. The image forming apparatus according to claim 2, wherein the processor is configured to cause the color different from the color of the diagnostic image to be magenta when the color of the diagnostic image is black.

4. The image forming apparatus according to claim 2, wherein the processor is configured to cause the color different from the color of the diagnostic image to be black when the color of the diagnostic image is not black.

5. The image forming apparatus according to claim 1, wherein the processor is configured to cause the information display image to be transferred so that the diagnostic image and the information display image are superimposed on each other on the recording medium.

6. The image forming apparatus according to claim 1, wherein the processor is configured to, where the diagnosis target image forming unit forms the diagnostic image under a specific condition, cause the information display image formed by the other one of the plurality of image forming units to be transferred to the recording medium.

7. The image forming apparatus according to claim 6, wherein the processor is configured to, where the diagnosis target image forming unit forms the diagnostic image without performing exposure processing for an image holder, cause the information display image formed by the other one of the plurality of image forming units to be transferred to the recording medium.

8. The image forming apparatus according to claim 6, wherein the processor is configured to, where the diagnosis target image forming unit forms the diagnostic image without performing charging processing and exposure processing for an image holder, cause the information display image formed by the other one of the plurality of image forming units to be transferred to the recording medium.

9. The image forming apparatus according to claim 1, wherein the diagnostic image identifies a component element in which a failure has occurred from among a plurality of component elements of the diagnosis target image forming unit.

10. The image forming apparatus according to claim 1, wherein the processor is configured to, where the diagnostic image is on an image holder in the diagnosis target image forming unit over a whole area of the image holder in an axis direction, cause the information display image formed by the other one of the plurality of image forming units to be transferred to the recording medium.

* * * * *